(12) United States Patent
Roychoudhury et al.

(10) Patent No.: US 11,558,004 B1
(45) Date of Patent: Jan. 17, 2023

(54) TWO-STAGE COMBUSTOR FOR THERMOPHOTOVOLTAIC GENERATOR

(71) Applicant: PRECISION COMBUSTION, INC., North Haven, CT (US)

(72) Inventors: Subir Roychoudhury, Madison, CT (US); Richard Mastanduno, Milford, CT (US); Francesco Macri, Farmington, CT (US); Bruce Crowder, Hamden, CT (US)

(73) Assignee: Precision Combustion, Inc., North Maven, CT (US)

( * ) Notice: Subject to any disclaimer, the term of this patent is extended or adjusted under 35 U.S.C. 154(b) by 282 days.

(21) Appl. No.: 16/798,630

(22) Filed: Feb. 24, 2020

Related U.S. Application Data (60) Provisional application No. 62/813,801, filed on Mar. 5, 2019.

(51) Int. Cl.
*H02S 10/30* (2014.01)
*H02S 10/10* (2014.01)

(52) U.S. Cl.
CPC .............. *H02S 10/30* (2014.12); *H02S 10/10* (2014.12)

(58) Field of Classification Search
CPC .................................. H02S 10/30; H02S 10/10
See application file for complete search history.

(56) References Cited

U.S. PATENT DOCUMENTS

| | | | |
|---|---|---|---|
| 4,087,962 A * | 5/1978 | Beremand | F23D 14/14 60/737 |
| 5,235,804 A * | 8/1993 | Colket, III | F23R 3/40 60/723 |
| 5,312,521 A | 5/1994 | Fraas | |
| 5,512,108 A * | 4/1996 | Noreen | C01B 13/0251 136/253 |
| 5,942,047 A | 3/1999 | Fraas | |
| 8,795,398 B2 | 8/2014 | Roychoudhury | |
| 9,903,585 B1 | 2/2018 | Crowder | |

(Continued)

FOREIGN PATENT DOCUMENTS

| WO | WO2004060546 A2 | 7/2004 |
|---|---|---|
| WO | WO2008046353 A2 | 4/2008 |
| WO | WO2012106048 A1 | 8/2012 |

OTHER PUBLICATIONS

Co-pending U.S. Appl. No. 16/798,565, filed Feb. 24, 2020, entitled "Two-Stage Combustor," Applicant: Precision Combustion, Inc.

*Primary Examiner* — Tae-Sik Kang
(74) *Attorney, Agent, or Firm* — Marie Zuckerman (57) ABSTRACT

A thermophotovoltaic generator incorporating a two-stage combustor for providing heat to a thermophotovoltaic cell. Combustor parts include a partial oxidation reactor, which functions catalytically to convert a hydrocarbon fuel and a first supply of an oxidant into a gaseous partial oxidation product; and further include downstream thereof, a deep oxidation reactor including a premixer plenum fluidly connected to a heat spreader comprising a porous matrix, such as a ceramic foam. Functionally, the deep oxidation reactor converts the gaseous partial oxidation product and a second supply of oxidant into complete combustion products. Heat produced by the two-stage combustor generates radiative energy from a photon emitter, which is directly converted to electricity in a photovoltaic diode cell.

11 Claims, 5 Drawing Sheets

(56) References Cited

U.S. PATENT DOCUMENTS

| | | |
|---|---|---|
| 10,001,278 B1 | 6/2018 | Roychoudhury |
| 2003/0000145 A1 | 1/2003 | Salemi |
| 2005/0066663 A1* | 3/2005 | Alvin ...................... F23C 13/08 |
| | | 60/723 |
| 2008/0078175 A1 | 4/2008 | Roychoudhury |
| 2009/0113889 A1 | 5/2009 | Roychoudhury |
| 2010/0126165 A1 | 5/2010 | Roychoudhury |
| 2011/0146264 A1 | 6/2011 | Roychoudhury |
| 2011/0165300 A1 | 7/2011 | Roychoudhury |
| 2018/0151791 A1* | 5/2018 | Mays ...................... E21B 41/00 |

* cited by examiner

TWO-STAGE COMBUSTOR FOR THERMOPHOTOVOLTAIC GENERATOR

CROSS-REFERENCE TO RELATED APPLICATIONS

This application claims the benefit of U.S. Provisional Application No. 62/813,801, filed Mar. 5, 2019.

GOVERNMENT RIGHTS

This invention was made with support from the U.S. government under Contract No. W911QX-17-P-0163, sponsored by the Department of Defense. The U.S. Government holds certain rights in this invention.

FIELD OF THE INVENTION

This invention pertains to a thermophotovoltaic (TPV) generator that functions to produce heat, light and electricity. This invention also pertains to a combustor that generates the heat in the thermophotovoltaic generator. Thermophotovoltaic generators are useful for electricity-generating applications in off-grid locations, that is, where an electrical grid is unavailable or temporarily disrupted, as might be found in logistics operations involving military and rescue maneuvers. Thermophotovoltaic generators are also useful when a quiet power source with a low acoustic signature is desired, as for example in covert operations and submarine auxiliary power applications. Since TPV generators lack heavy moving parts and provide advantageous power per unit weight, TPV generators are also useful in applications where weight and portability are considerations, as might be found in spacecraft and space probes. Finally, uses can also be found to incorporate TPV generators into common-place applications as electricity-cogenerating units alongside, for example, gas turbines, residential burners and appliances, and in hybrid vehicles.

BACKGROUND OF THE INVENTION

Thermophotovoltaic (TPV) generators convert thermal energy directly into electricity without any intermediate working substance and without moving parts. Typically, a combustor burning a hydrocarbon fuel provides the thermal energy needed to actuate a TPV cell comprised of (a) an emitter that spontaneously emits photon radiation in response to thermal excitation of charges in the emitter material, and (b) at least one photovoltaic diode that absorbs the photons thereby initiating a photoelectric reaction and generating a flow of electricity. The thermal emitter exhibits a peak electromagnetic wavelength and a total radiated energy density depending upon the temperature of the emitter according to Wien's law. As temperature increases, peak wavelength shifts from longer wavelengths to shorter wavelengths; while energy density increases exponentially. Thermal emitters operate reliably at a temperature between about 900° C. and 1,400° C. Typically, the TPV generator comprises a plurality of TPV cells disposed in close proximity across a heated surface of the combustor.

Stable, non-catalytic combustion of a hydrocarbon fuel, like natural gas, at ambient pressure in a single stage combustor requires a near-stoichiometric ratio of the oxidant relative to the hydrocarbon fuel. The term "stoichiometric ratio" refers herein to an exact ratio of moles of oxidant to moles of hydrocarbon fuel required to convert all of the fuel to complete (or deep) oxidation products, namely, carbon dioxide and water. For methane, the stoichiometric ratio equals 2 moles molecular oxygen ($O_2$) per mole methane ($CH_4$). "Near-stoichiometric" molar ratios for methane combustion could range from about 1.6 moles molecular oxygen per mole methane (1.6:1) to about 2.4:1, which ratios correlate to a phi ($\varphi$) of 0.8:1 to about 1.2:1, where phi compares the actual molar ratio employed to the stoichiometric ratio. Such high ratios of oxidant to fuel result in a flame temperature exceeding 1,200° C., which is typically too hot for metallic materials of construction. As a further disadvantage, single stage combustors operating on conventional hydrocarbon fuels can exhibit fluctuations in temperature and non-uniformity in temperature distribution within the combustor. These attributes are particularly disadvantageous when the combustor is associated with an array of photon emitters in a TPV generator, because steady and uniform photon emission requires a steady and uniform temperature across the combustor.

Additionally, while combustion in the presence of a catalyst in a single stage combustor is useful in promoting complete conversion and improved selectivity of the combustion process, catalyst lifetime is greatly reduced in an oxidizing environment at temperatures exceeding 1,200° C. Generally, catalyst lifetime is lengthened as temperature decreases. Moreover, at temperatures exceeding 1,200° C. the catalyst may be lost through volatilization.

In view of the above, it would be desirable to design an improved combustor apparatus for use in a thermophotovoltaic generator. The combustor should provide for complete combustion of a hydrocarbon fuel into a mixture of carbon dioxide and water with minimal, if any, emissions of NOx and hydrocarbons. The design should take into account materials of construction suitable for operation at ambient pressure and a temperature of at least 1,000° C., and more preferably, up to about 1,200° C. If such a combustor were to employ an oxidation catalyst for improved conversion and selectivity, then under operating conditions the catalyst should sustain an acceptable durability and lifetime at operating temperatures, before needing to be replaced. Finally, in order to provide improvements for TPV applications, the design should incorporate structural features for efficiently transferring the thermal heat produced in the combustor to the photon emitter. Such features should provide for reduced fluctuations in temperature within the combustor as well as a more uniform temperature distribution across the combustor so as to ensure a steady and uniform emission of photons from the photon emitter.

SUMMARY OF THE INVENTION

In one aspect, this invention provides for a two-stage combustor comprising:
(a) a partial oxidation reactor, comprising the following components:
  (i) a fuel inlet,
  (ii) a first oxidant inlet,
  (iii) a partial oxidation reaction zone comprising a mesh substrate having a partial oxidation catalyst supported thereon, the partial oxidation reaction zone being disposed in fluid communication with the fuel inlet and first oxidant inlet, and
  (iv) an outlet fluidly connected to the partial oxidation reaction zone; and
(b) a deep oxidation reactor comprising the following components:
  (i) a premixer plenum having an upstream end and a downstream end; wherein at the upstream end the premixer plenum is fluidly connected to the outlet of the partial oxidation reactor; and further wherein the premixer plenum comprises a second oxidant inlet;

(ii) a heat spreader having an upstream end and a downstream end; wherein at the upstream end the heat spreader is fluidly connected to the downstream end of the premixer plenum; and further wherein the heat spreader comprises a porous matrix capable of withstanding a temperature greater than about 900° C.; and (iii) an outlet pathway fluidly connected to the downstream end of the heat spreader.

In another aspect, this invention provides for a thermophotovoltaic generator comprising: (1) a two-stage combustor; (2) a photon emitter disposed in thermal communication with the two-stage combustor; and (3) at least one photovoltaic diode cell disposed in radiative communication with the photon emitter;

wherein the two-stage combustor comprises:

(a) a partial oxidation reactor comprising the following components:

(i) a fuel inlet, (ii) a first oxidant inlet, (iii) a partial oxidation reaction zone comprising a mesh substrate having a partial oxidation catalyst supported thereon, the partial oxidation reaction zone being disposed in fluid communication with the fuel inlet and the first oxidant inlet, and (iv) an outlet fluidly connected to the partial oxidation reaction zone; and (b) a deep oxidation reactor comprising the following components:

(i) a premixer plenum having an upstream end and a downstream end; wherein at the upstream end the premixer plenum is fluidly connected to the outlet of the partial oxidation reactor; and further wherein the premixer plenum comprises a second oxidant inlet;

(ii) a heat spreader having an upstream end and a downstream end; wherein at the upstream end the heat spreader is fluidly connected to the downstream end of the premixer plenum; and further wherein the heat spreader comprises a porous matrix capable of withstanding a temperature greater than about 900° C.; and (iii) an outlet pathway fluidly connected to the downstream end of the heat spreader.

The two-stage combustor of this invention functionally splits the combustion of a hydrocarbon fuel into two process segments. A first stage of the combustor comprises a partial oxidation reactor wherein under operating conditions partial oxidation (POX) occurs, such that a hydrocarbon fuel is oxidized into a gaseous partial oxidation product comprising predominantly carbon monoxide and hydrogen. A second stage of the combustor comprises a deep oxidation reactor wherein under operating conditions complete combustion occurs, either catalytically or non-catalytically, so as to convert the gaseous partial oxidation product into complete oxidation products of carbon dioxide and water with advantageously low levels of undesirable NOx and hydrocarbons emissions. Additionally, the two-stage combustor functions in the TPV generator to deliver thermal energy (heat) to the photon emitter of a thermophotovoltaic cell resulting in generation of electricity.

In one advantageous embodiment, a catalyst is disposed only within the partial oxidation reactor; whereas the deep oxidation reactor does not contain a catalyst. Suitable partial oxidation catalysts including those of the noble metal family are able to withstand temperatures of catalytic partial oxidation processes, which are generally less than 1,100° C. and, more likely, between 850° C. and about 1,050° C. These lower temperatures and reducing conditions advantageously provide for catalyst durability and longevity as well as high selectivity to hydrogen and carbon monoxide products. As well, at these lower temperatures and under the reducing and fuel-rich conditions of POX reactions, the catalyst is less prone to decay and losses through volatilization. Further in this embodiment, the second stage deep oxidation reactor is operated non-catalytically allowing for sustained higher temperatures of greater than about 900° C., and in certain embodiments greater than about 1,000° C. up to 1,400° C., as dictated by the deep oxidation process. This then results in more complete combustion while avoiding catalyst degradation problems.

In an alternative embodiment, both the POX and the deep oxidation reactors utilize a catalyst. In this instance, the catalyst located in the deep oxidation reaction is selected from sturdier catalytic materials, which better tolerate the higher temperatures and oxidation reaction conditions.

As another advantage, hydrogen generated in the first stage POX reactor provides for improved combustion stability in the second stage deep oxidation reactor. This in turn provides advantageously for reduced fluctuations in temperature within the combustor as well as a more uniform temperature distribution across the combustor, which beneficially results in a steadier and more uniform emission of photons across the photon emitter. Finally, specific structural features of the combustor result in efficient heat transfer to the photon emitter, thereby providing for efficient radiative emission of photons and conversion of photonic energy directly into electricity in the photovoltaic diode(s).

DETAILED DESCRIPTION OF THE INVENTION

In one embodiment, this invention provides for a thermophotovoltaic generator comprising: (1) a two-stage combustor; (2) a photon emitter disposed in thermal communication with the two-stage combustor; and (3) at least one photovoltaic diode cell disposed in radiative communication with the photon emitter;

wherein the two-stage combustor comprises:

(a) a partial oxidation reactor comprising:

(i) a fuel inlet for feeding a hydrocarbon fuel into a partial oxidation reaction zone, (ii) a first oxidant inlet for feeding a first supply of an oxidant into the partial oxidation reaction zone, (iii) the partial oxidation reaction zone comprising a mesh substrate having a partial oxidation catalyst supported thereon, the partial oxidation reaction zone being in fluid communication with the fuel inlet and the first oxidant inlet; and (iv) an outlet fluidly connected to the partial oxidation reaction zone for exhausting a partial oxidation product; and (b) a deep oxidation reactor comprising:

(i) a premixer plenum having an upstream end and a downstream end; wherein at the upstream end the premixer plenum is fluidly connected to the outlet of the partial oxidation reactor; and further wherein the premixer plenum comprises a second oxidant inlet for feeding a second supply of an oxidant into the premixer plenum;

(ii) a heat spreader having an upstream end and a downstream end; wherein at the upstream end the heat spreader is fluidly connected to the downstream end of the premixer plenum; and further wherein the heat spreader comprises a ceramic foam matrix capable of withstanding a temperature greater than about 1,000° C., which is disposed in thermal communication with the photon emitter; and (iii) an outlet pathway fluidly connected to the downstream end of the heat spreader for exhausting a gaseous combustion product.

The term "upstream end" signifies a side or inlet of a specified component in the two-stage combustor wherein a fluid flow enters the component. The term "downstream end" signifies a side or outlet of a specified component in the two-stage combustor wherein a fluid flow exits the component.

It should be appreciated that under operating conditions thermal energy generated in the two-stage combustor is transferred to the photon emitter, which upon thermal excitation emits photons generally in an infrared region of the electromagnetic spectrum. To facilitate thermal transfer from the combustor to the photon emitter, the heat spreader of the deep oxidation combustor is disposed in thermal communication with the photon emitter, typically in close proximity to the photon emitter. The phrase "in close proximity" means that the heat spreader, in one exemplary embodiment, physically contacts the photon emitter. In another embodiment, the phrase "in close proximity" means that the heat spreader does not physically contact the photon emitter, but rather a small gap exists between the two components. In this embodiment, the gap is sized such that gaseous streams flow freely through the gap, while allowing for thermal heat transfer from the heat spreader to the photon emitter to remain acceptably efficient.

Photon emission depends upon chemical composition of the emitter and upon temperature. For a selected chemical composition and selected temperature, a curve can be generated or found in the art defining intensity of photonic emission as a function of wavelength. Generally, the curve peaks at a particular wavelength. A set of such curves can be generated for a given composition and a set of selected temperatures. To facilitate efficient photon emission in this invention, the operating temperature of the deep oxidation reactor is tuned to an appropriate peak emission temperature of the selected emitter. Conversely, one can select an emitter that exhibits a peak emission at the intended operating temperature of the deep oxidation reactor.

In one preferred embodiment of this invention, the deep oxidation reactor does not comprise a catalyst. In such instance, the combustion process within the deep oxidation reactor is non-catalytic. By avoiding the use of a catalyst in the deep oxidation reactor (both in the premixer plenum and in the heat spreader) where temperatures are at their highest, the apparatus avoids problems associated with catalyst volatilization and degradation.

Functionally, it is desirable to have the combustion occur in the heat spreader, which is positioned in thermal communication with the photon emitter, for example, in close proximity to the photon emitter. Under some operating conditions, however, diffusion flame combustion might occur within the premixer plenum. To avoid a diffusion flame combustion within the premixer plenum, a flame arrestor can be positioned within the premixer plenum. In any case, the premixer plenum does not contain a foam matrix or a catalyst.

Figure 1:
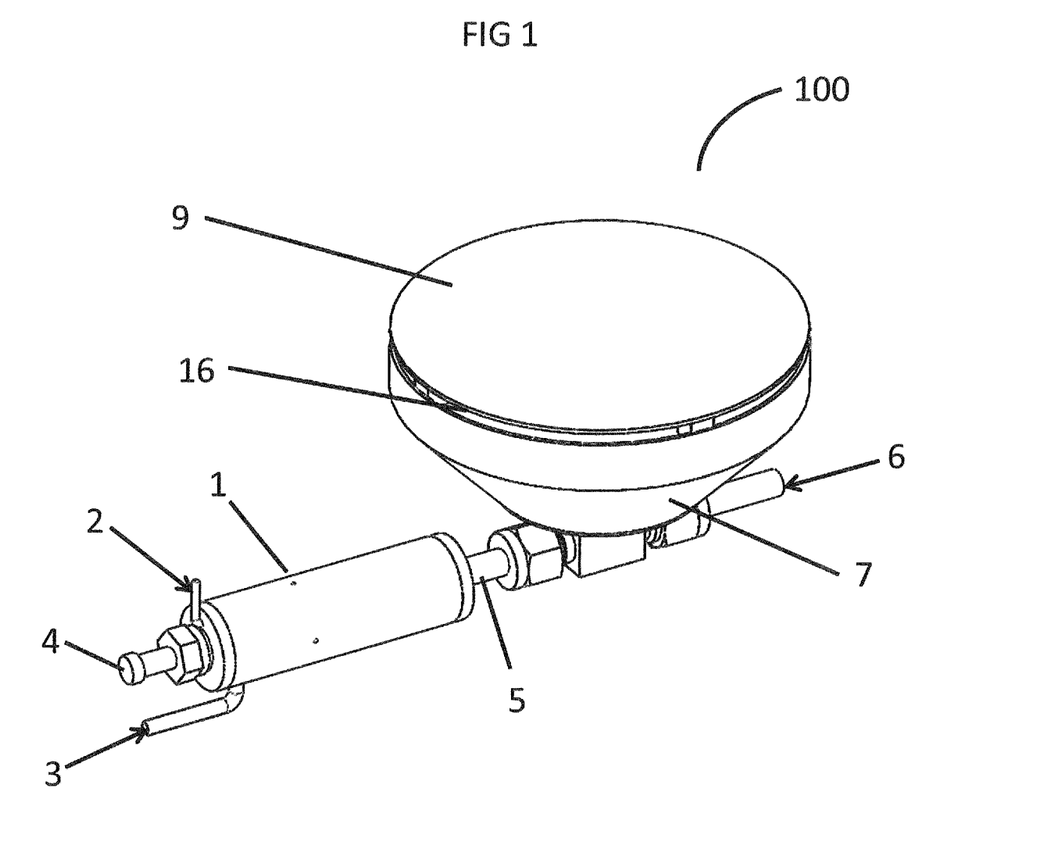
FIG. 1 depicts in isometric view an exemplary embodiment of the two-stage combustor apparatus of this invention in association with a TPV emitter.
Figure 2:
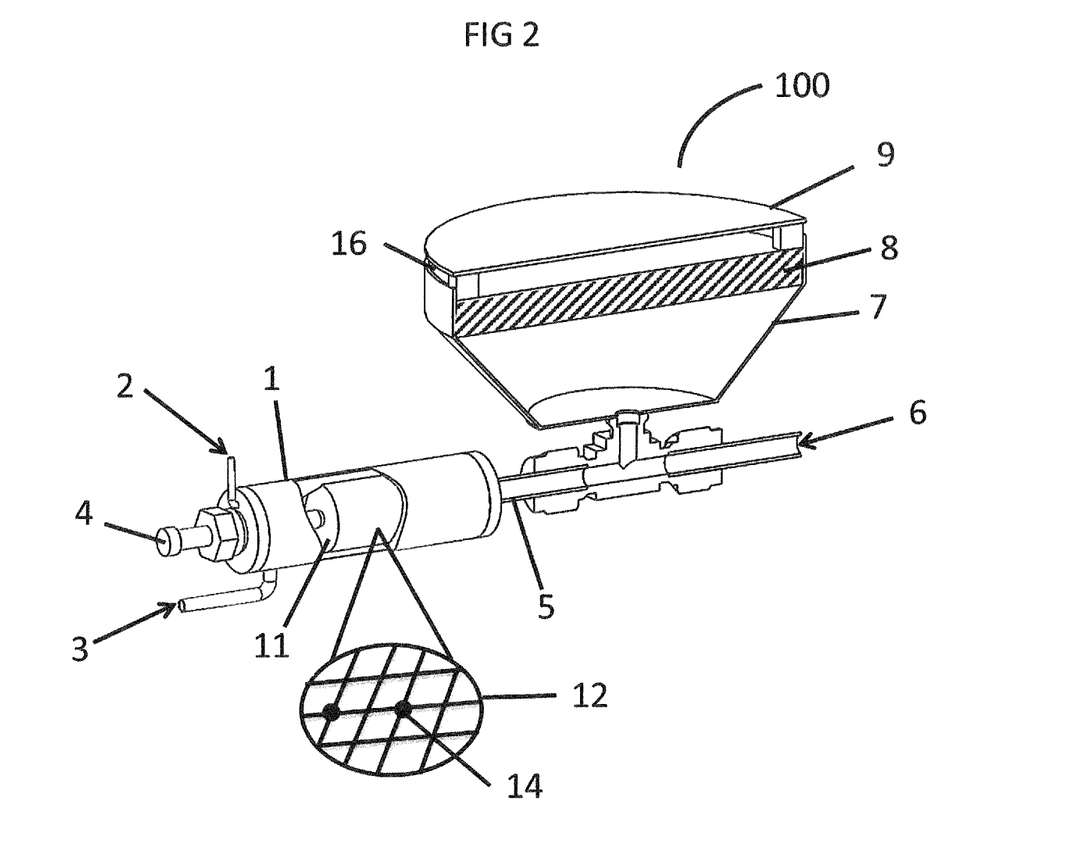
FIG. 2 depicts the exemplary embodiment of FIG. 1 in a transverse cross-sectional view.

Features of this invention are further defined and clarified by consideration of the following figures and embodiments. Reference is made to FIG. 1 illustrating in isometric view an exemplary embodiment 100 of the TPV generator of this invention comprising the two-stage combustor apparatus of this invention in association with a TPV emitter. See also FIG. 2 illustrating the same embodiment in transverse cross-sectional view. The TPV generator 100 comprises a partial oxidation reactor 1 fitted with a fuel inlet 2 for feeding a hydrocarbon fuel into a partial oxidation reaction zone 11 and fitted with a first oxidant inlet 3 for feeding a supply of a first oxidant into the partial oxidation reaction zone 11. The partial oxidation reaction zone 11 comprises a mesh substrate 12 having a reforming catalyst 14 supported thereon. Glow plug 4 is positioned at the upstream inlet end of the partial oxidation reaction zone 11 for initiating a catalytic partial oxidation reaction therein. The downstream end of the partial oxidation reactor 1 provides an outlet 5 for exhausting partial oxidation reaction products (reformed fuel products) comprising predominantly hydrogen ($H_2$) and carbon monoxide (CO).

With further reference to FIGS. 1 and 2, the deep oxidation reactor comprises a premixer plenum 7, which at its upstream end is fluidly connected to the outlet 5 of the partial oxidation reactor 1. The premixer plenum 7 is further comprised of a second oxidant inlet 6 for feeding a second supply of oxidant into the premixer plenum 7. The heat spreader 8 is disposed in fluid communication with the downstream end of the premixer plenum 7 and comprises a porous matrix capable of withstanding a temperature greater than 900° C., in this instance shaped as a circular layer. Downstream from the heat spreader 8 is outlet gap pathway 16, from which deep combustion gases ($CO_2$ and $H_2$) are exhausted with minimal NOx and hydrocarbons emissions. Proximate to the heat spreader 8 is disposed an array of TPV cells 9, comprising an emitter that functions to emit photons and least one, and preferably, a plurality of diode photovoltaic cells that collect the emitted photons and convert them into electricity.

Figure 3:
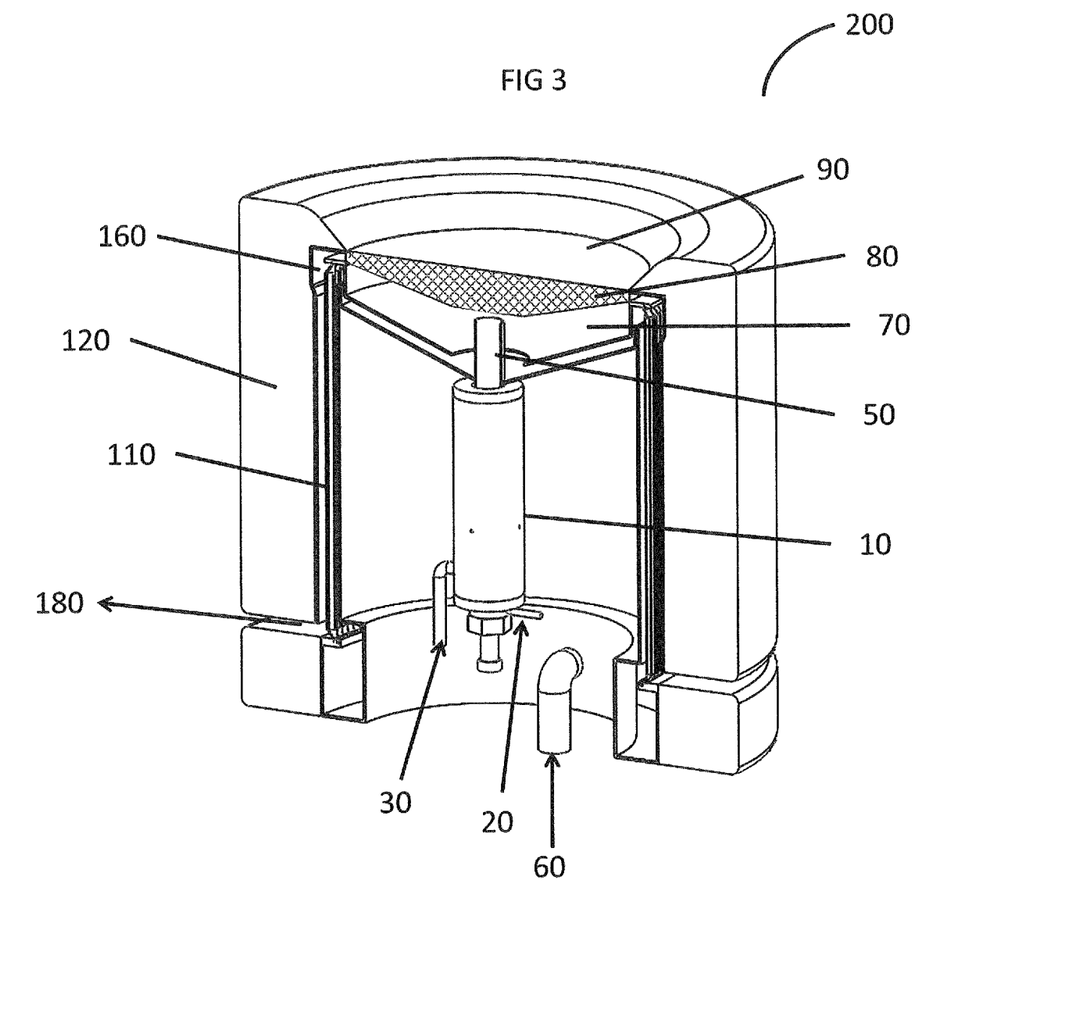
FIG. 3 illustrates in isometric view another exemplary embodiment of the thermophotovoltaic generator of this invention including a heat recuperation structure.

Reference is made to FIG. 3 illustrating in isometric view another exemplary embodiment 200 of the thermophotovoltaic generator of this invention comprising a two-stage combustor associated with an array of TPV cells. Apparatus 200 comprises a partial oxidation reactor 10 fitted with a fuel inlet 20 and a first oxidant inlet 30 for feeding supplies of fuel and the first oxidant, respectively, into the POX reactor 10. The downstream end of the partial oxidation reactor 10 provides an outlet 50 for exhausting the partial oxidation reaction products (reformed fuel products). FIG. 3 does not illustrate the interior of the POX reactor 10, which comprises, in similar fashion to FIG. 2, a partial oxidation reaction zone 11 comprising a mesh substrate 12 having a POX catalyst 14 supported thereon.

Figure 5:
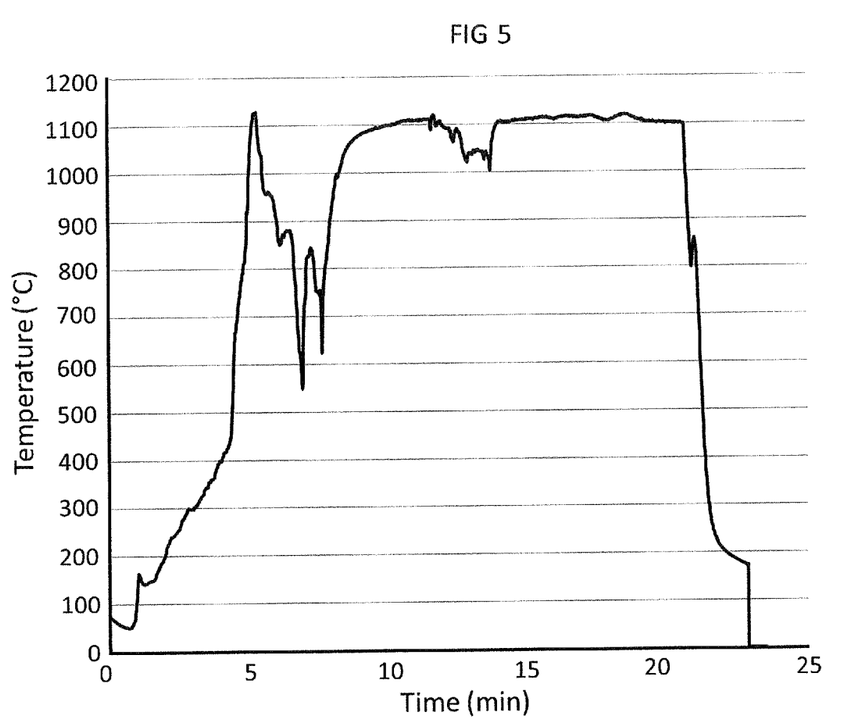
FIG. 5 depicts a graph plotting temperature as a function of time during operation of an embodiment of the two-stage combustor-emitter section of the TPV generator of this invention.

Further to FIG. 3, the deep oxidation reactor comprises a premixer plenum 70, which at its upstream end is fluidly connected to the outlet 50 of the partial oxidation reactor 10. The premixer plenum 70 is fluidly connected to the second oxidant inlet 60 for feeding a second supply of oxidant into the premixer plenum 70. The heat spreader 80 is disposed in fluid communication with the downstream end of the premixer plenum 70. In fluid communication with the heat spreader 80 is outlet pathway 160, from which combustion gases are exhausted. Proximate to the heat spreader 80 is disposed an array of TPV cells 90, functioning to emit photons via an emitter and convert said photons to electricity via an array of diode photovoltaic cells. FIG. 3 further illustrates a heat recuperation structure, wherein the combustion exhaust outlet 160 extends through an exhaust passage bounded by a thermally conductive wall 110 to final exhaust outlet 180. The thermally conductive wall is capable of transmitting heat from the hot exhausting combustion products to the cool incoming second supply of oxidant entering through inlet 60 and flowing on the opposite side of thermally conductive wall 110 towards the premixer plenum 70. Insulation 120 surrounds the entire two-stage combustor so as to retard heat losses to the environment. Refer to FIG. 5 of U.S. Pat. No. 8,749,508, incorporated herein by reference, illustrating in higher detail construction of the thermally conductive wall 110, which is typically provided in a vertical corrugated structure.

Figure 4:
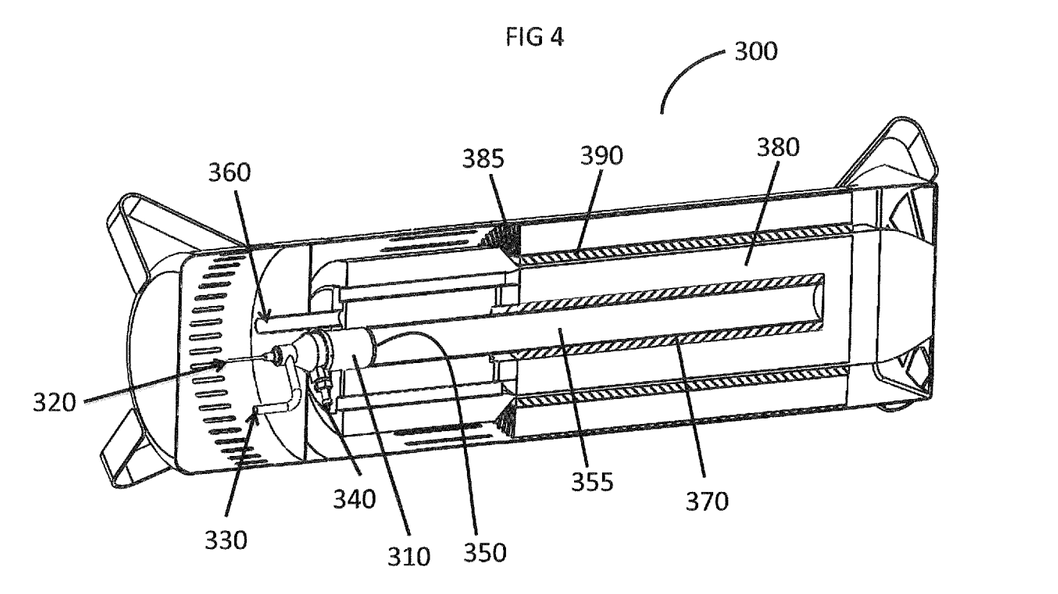
FIG. 4 illustrates in isometric view another exemplary embodiment of the thermophotovoltaic generator of this invention.

Reference is made to FIG. 4 illustrating yet another embodiment 300 of the thermophotovoltaic generator of this invention, which is constructed concentrically to provide for radial fluid flow. Apparatus 300 comprises a partial oxidation reactor 310 fitted with a fuel inlet 320 and a first oxidant inlet 330 for feeding supplies of fuel and first oxidant, respectively, into the POX reactor 310. The downstream end of the partial oxidation reactor 310 provides an outlet 350 for exhausting the partial oxidation reaction products into a porous chamber 355 allowing for a radial flow passage. FIG. 4 does not illustrate the interior of the POX reactor 310, which comprises in similar fashion to FIG. 2, a partial oxidation reaction zone 11 comprising a mesh substrate 12 having a POX catalyst 14 supported thereon. Further to FIG. 4, the deep oxidation reactor comprises a premixer plenum 370, which at its upstream side is fluidly connected to the porous chamber 355, such that reaction products flow radially outward from the porous chamber 355 into the premixer plenum 370. Second oxidant inlet 360 feeds a second supply of oxidant into the premixer plenum 370. A porous heat spreader 380 is disposed in fluid communication via radial flow with the downstream side of the premixer plenum 370. Proximate to the heat spreader 380 is disposed an array of TPV cells 390. Combustion gases exhaust the porous heat spreader 380 via exit through a recuperator 385.

Each component of the two-stage combustor apparatus of this invention is constructed from a material capable of withstanding the temperatures to which the relevant part is to be exposed. Moreover, each part is designed to maximize heat transfer downstream to the heat spreader, from which thermal energy is efficiently transferred to a photon emitter. Typically, the first stage partial oxidation reactor and second stage deep oxidation reactor are combined within a housing that is constructed from a material capable of withstanding temperatures up to 1,400° C., preferably up to 1,200° C., for prolonged periods. Such metals include iron-chromium alloys (FeCrAlY); nickel-chromium alloys and nickel-chromium-iron alloys, such alloys to include HASTELLOY® brand alloys (Haynes International) including HASTELLOY brand Alloy X ("HastX"), INCONEL® brand alloys (Huntington Alloys, Inc.) including INCONEL brand Alloy 625, INCONEL brand Alloy 718, INCONEL brand Alloy 600, and INCONEL brand Alloy 601, as well as stainless steel when temperature permits. The fuel and oxidant inlets to the partial oxidation reactor and the secondary oxidant inlet to the premixer plenum are constructed, likewise, from any of the above-identified alloys, but can also be satisfactorily constructed from standard stainless steel or high temperature stainless steel in those instances where the inlets are exposed to temperatures not exceeding about 800° C. The housing of the two-stage combustor is typically lined with an insulator at least on its interior surface, if not also its exterior surface, so as to minimize losses of combustion heat to the surrounding environment. Suitable insulators include high temperature ceramic fiber insulation, non-limiting examples of which include KAOWOOL® brand ceramic fiber insulation (Thermal Ceramics, Inc.) and high temperature aerogel insulation, such as PYROGEL® brand aerogel insulation (Aspen Aerogels, Inc.). The combustor external exhaust outlet (FIG. 3/180), which is exposed to temperatures of about 150° C. to 250° C., typically employs a metallic construction material of suitable thermal durability, including any of the aforementioned alloys. In the embodiment of FIG. 3, wherein the secondary oxidant inlet 60 pathway to the premixer plenum 70 shares a common thermally-conductive wall 110 with the combustor exhaust pathway (connecting internal outlet 160 to external outlet 180), the wall is typically comprised of a HASTELLOY brand Alloy X, or a FeCrAlY iron-chromium alloy, or stainless steel, any one of which is suitably provided as a thin wall or foil sheet.

The partial oxidation reactor beneficially employed in the process of this invention comprises any one of those partial oxidation (POX) reactors known in the art that is capable of converting the mixture of hydrocarbon fuel and the first oxidant into a gaseous partial oxidation product comprising hydrogen and carbon monoxide. Non-limiting examples of suitable partial oxidation reactors include those described in the following patent documents: U.S. Pat. Nos. 7,976,594; 8,557,189; WO 2004/060546; and US 2011/0061299, incorporated herein by reference.

According to the invention, under operating conditions the hydrocarbon fuel is fed from a fuel supply, such as a fuel tank, through a first inlet into the partial oxidation reactor, preferably, into a mixer within the partial oxidation reactor. The fuel inlet comprises any known inlet device for feeding the hydrocarbon fuel, for example, a nozzle, atomizer, vaporizer, injector, mass flow meter, or any other suitable flow control device. The injector also functions to quantify (or meter) the fuel fed to the partial oxidation reactor. Likewise, the first supply of oxidant is fed into the partial oxidation reactor, preferably, into the mixer section of the partial oxidation reactor, through the first oxidant inlet comprising any conventional inlet device, for example, a nozzle, injector, or mass flow meter capable of feeding the oxidant into the partial oxidation reactor.

In one embodiment, the mixer of the partial oxidation reactor comprises swirler vanes and baffles to facilitate mixing the hydrocarbon fuel and oxidant as well as to facilitate atomization of any liquid fuel, when a liquid fuel is employed. In one other embodiment, the mixer comprises a combination of a pulsed electromagnetic liquid fuel injector and a pulsed oxidant injector, which feed the liquid fuel and first supply of oxidant, respectively, into an atomizer that thoroughly atomizes the liquid fuel and mixes it with the oxidant. This combined dual injector-atomizer device is described in U.S. Pat. No. 8,439,990, incorporated herein by reference. If a gaseous hydrocarbon fuel is employed, there is no requirement to provide an atomizer.

In one embodiment, the hydrocarbon fuel is fed to the mixer at ambient temperature without preheating. In another embodiment, the hydrocarbon fuel is preheated prior to being fed to the mixer. In the event that a liquid hydrocarbon fuel is employed, we have found that heat generated in the reaction zone of the partial oxidation reactor is sufficient to support liquid fuel vaporization at a level required for stable partial oxidation throughout the partial oxidation catalyst. As a consequence, the partial oxidation reactor and POX process therein provide gasification of a liquid fuel without a requirement for supplying external heat or steam to the partial oxidation reactor. The first supply of oxidant is generally fed into the mixer without preheating, but variations in temperature may be implemented as desired.

The partial oxidation reactor comprises a catalytic reaction zone having disposed therein a porous substrate onto which a partial oxidation catalyst is supported, such porous substrate configured to provide thorough mixing of the fuel and oxidant passing there through. To achieve this goal, in one embodiment the substrate is provided as a mesh substrate, structured as a reticulated net or reticulated screen comprising a plurality of pores or cells or channels, preferably, having an ultra-short-channel-length as noted hereinafter. In one embodiment, the mesh is suitably provided in a coiled configuration of cylindrical shape having an inner diameter and a larger outer diameter such that reactants flowing there through move along a radial flow path from an inlet along the inner diameter to an outlet along the outer diameter of the coil. In another embodiment the mesh is suitably provided as one mesh sheet or a plurality of stacked mesh sheets with a bulk flow from an inlet end of the stack to an outlet end of the stack. In any embodiment, the bulk configuration of the substrate provides for a plurality of void volumes in random order, that is, empty spaces having essentially no regularity along the flow path from the partial oxidation reactor upstream inlets to the partial oxidation reactor downstream outlet.

In one exemplary embodiment, the substrate comprises an ultra-short-channel-length mesh; in a more preferred embodiment thereof a MICROLITH® brand ultra-short-channel-length mesh (Precision Combustion, Inc., North Haven, Conn., USA). A description of the ultra-short-channel-length mesh is found, for example, in U.S. Pat. No. 5,051,241, incorporated herein by reference. Generally, the mesh comprises short channel length, low thermal mass monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along a pore or channel from inlet to outlet, for example, as measured from an inlet on one side of a sheet of mesh to an outlet on another side of the sheet. (This measurement is not to be confused with the overall length of the flow path through the entire mesh substrate from the upstream inlet of the substrate to the downstream outlet of the substrate.) In another embodiment, the channel length of the mesh is no longer than the diameter of the elements from which the mesh is constructed; thus, the channel length may range from 25 μm (0.001 inch) up to about 100 μm (0.004 inch) and preferably not more than about 350 μm (0.014 inch). In view of this ultra-short channel length, the contact time of reactants with the mesh and catalyst supported thereon advantageously ranges from about 5 milliseconds (5 msec) to about 350 msec.

The MICROLITH brand ultra-short-channel-length mesh typically comprises from about 100 to about 1,000 or more flow channels per square centimeter. More specifically, each layer of mesh typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. MICROLITH brand meshes can be manufactured in the form of woven wire screens, woven ceramic fiber screens, pressed metal or ceramic screens; or they can be manufactured by perforation and expansion of a thin metal sheet as disclosed in U.S. Pat. No. 6,156,444, incorporated herein by reference; or alternatively manufactured by 3-D printing or by a lost polymer skeleton method.

The MICROLITH brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh of this invention avoids boundary layer buildup. Since heat and mass transfer coefficients depend on boundary layer thickness, avoiding boundary layer buildup enhances transport properties. Employing the ultra-short-channel-length mesh, such as the MICROLITH brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. The preferred MICROLITH brand of ultra-short-channel-length mesh also advantageously provides for a light-weight portable size, a high throughput, a high one-pass yield of hydrogen-containing partial oxidation product, a low yield of coke and coke precursors, and an acceptably long catalyst lifetime, as compared with alternative substrates including ceramic monolith and pelleted substrates.

The mesh is typically constructed from any material capable of withstanding the temperature at which the reforming zone operates, generally, in a range from about 750° C. to about 1,200° C. Such materials include metals and ceramic materials of suitable temperature durability. Suitable metal meshes include, without limitation, those constructed from nickel-chromium-iron alloys, iron-chromium alloys, and iron-chromium-aluminum alloys. The term "ceramic" refers to inorganic non-metallic solid materials with prevalent covalent bonds, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ultra-short-channel-length ceramic mesh comprising woven silica, both patents incorporated herein by reference.

In another exemplary embodiment, the porous substrate is constructed of an analogous porous structure of metal, ceramic, or other porous structured substrate material having an ultra-short-channel length, comprising an interconnected network of solid struts defining a plurality of pores of an open-cell configuration. The pores can have any shape or diameter; but typically, a number of pores that subtend one inch designates a "pore size," which for most purposes ranges from about 5 to about 80 pores per inch. The relative density of such structures, taken as the density of the porous structure divided by the density of solid parent material of the struts, typically ranges from about 2 to about 15 percent. Manufactured or structured ultra-short-channel-length substrates are commercially available in a variety of materials capable of withstanding the operating temperature of the partial oxidation reactor.

The mesh substrate disposed within the partial oxidation reactor supports a catalyst capable of facilitating partial oxidation reactions, wherein a mixture of the hydrocarbon fuel and the first supply of oxidant are converted to partially-oxidized products, specifically, a synthesis gas comprising hydrogen and carbon monoxide. A suitable partial oxidation catalyst comprises at least one metal of Group VIII of the Periodic Table of the Elements, including iron, cobalt, nickel, ruthenium, rhodium, palladium, osmium, iridium, platinum, and mixtures thereof. The deposition of the Group VIII metal(s) onto the mesh is implemented by methods well known in the art. Alternatively, finished catalysts comprising Group VIII metal(s) supported on the MICROLITH brand mesh substrate are available from Precision Combustion, Inc., North Haven, Conn.

In the partial oxidation process, in one embodiment, the mesh substrate supporting the partial oxidation catalyst is initially heated using a commercial ignition device, for example a resistive glow plug heating element, disposed within the partial oxidation reactor in close proximity to the mesh. The hydrocarbon fuel fed to the partial oxidation reactor is likewise heated via the ignition device. The ignition device is energized until temperature sensors located within the partial oxidation reactor indicate a temperature sufficient to initiate catalytic activity ("light-off temperature"). Once the catalyst is ignited, the ignition device is de-energized, and energy from the resulting exothermic partial oxidation reaction sustains catalytic operation without a need for inputting external heat. The ignition device allows for start-up from cold or ambient fuel conditions without a need for a fuel vaporizer or other external source of heat.

The premixer plenum of the deep oxidation reactor comprises an open-spaced area designed to mix the partial oxidation product(s) and the incoming secondary supply of oxidant. Typically, the premixer plenum does not contain a foam matrix or any catalyst. In order to retard flashback into the partial oxidation reactor or a diffusion flame from forming in the premixer plenum, in one embodiment a flamer arrestor is disposed within the premixer plenum.

The porous matrix of the deep oxidation reactor comprises an open-celled foam, sponge or other porous material, which is constructed of a structure of struts defining a plurality of open-celled pores and channels. In one embodiment, the porous matrix possesses a regular and periodic array of cells, for example, of one size and regular disposition. In another embodiment, the porous matrix possesses an irregular or asymmetric distribution of different-sized cells winding through the strut structure in serpentine fashion. Typically, the porous matrix has a pore density ranging from about 10 to about 30 pores per inch (10-30 ppi). The porous matrix is provided in any suitable material of construction sufficiently durable to withstand the operating temperature of the deep oxidation reactor. Depending upon temperature, a metallic, ceramic, or cermet porous matrix is suitable, providing acceptable durability at an operating temperature greater than about 900° C. Metals are suitable for operating temperatures less than about 1,100° C. Suitable non-limiting examples of such metals include the iron-chromium alloys, including FeCrAlY iron-chromium alloy; nickel-chromium alloys and nickel-chromium-iron alloys mentioned hereinabove. Ceramics are preferred for higher operating temperatures, as dictated by the operating temperature of the photovoltaic cell. In this instance, ceramics provide durability at a temperature greater than about 1,000° C., and more preferably greater than about 1,100° C. Suitable ceramics are selected from various non-metal refractories, non-limiting examples of which include silica, alumina, aluminosilicates, such as calcium aluminosilicates, as well as mullite, silicon carbide, and zirconia.

The photovoltaic cell employed in this invention comprises a photon emitter and at least one photovoltaic diode. The emitter comprises any material capable of radiating photons upon thermal excitation, preferably, with acceptable levels of efficiency and temperature resistance. Typical emitters operate well between about 900° C. and about 1300° C., while some can withstand temperatures up to 1,700° C. Emission increases with temperature and is usually at the near-infrared and infrared spectral range. Suitable emitters include, without limitation, polycrystalline silicon carbide, tungsten, rare-earth oxides including ytterbium oxide ($Yb_2O_3$) and erbium oxide ($Er_2O_3$), as well as any of present day photonic crystals. The photon emitter is disposed downstream of the heat spreader, in close proximity thereto, so as to maximize heat transfer from the heat spreader to the emitter and minimize heat losses to the environment. In one embodiment, the photon emitter is in direct solid-to-solid contact with the heat spreader. In another embodiment, a gap exists between the heat spreader and the photon emitter. The gap is sized to provide for acceptably efficient heat transfer from the heat spreader to the photon emitter. Typically, the photon emitter is disposed at a distance greater than about 3 mm (0.125 inch) and less than about 7.5 cm (3 inches) from the heat spreader.

The photovoltaic diode cell or plurality of such cells is selected from any of those semi-conductors capable of converting radiant energy directly into electrical energy. For efficient conversion, absorption characteristics of the diode cell are matched with the emissive properties of the photon emitter. Such materials include, without limitation, silicon (Si), germanium (Ge), gallium antimonide (GaSb), germanium antimonide (GeSb), indium gallium arsenide (InGaAs), indium gallium arsenide antimonide (InGaAsSb), and indium phosphide arsenide antimonide (InPAsSb). The diode is disposed downstream of the photon emitter in a manner that maximizes as much as possible the collection of all emitted photons. Photons that escape collection can be redirected by use of mirrors and/or filters back towards the emitter or the diode(s) to improve the efficiency of electrical conversion.

The thermophotovoltaic generator of this invention can be assembled in any manner that allows for efficient and essentially uniform distribution of heat, photon radiation, and photon collection by the photoelectric diode cell(s). In one embodiment, as seen in FIGS. 1-3, adjacent one face of a disk-shaped photon emitter is disposed a heat spreader of similar shape and diameter; while adjacent an opposite face of the disk-shaped photon emitter is disposed a circular array of photoelectric diodes of overall similar dimensions. In another embodiment, as seen in FIG. 4, a cylindrical-shaped heat spreader functioning as a flame tube is surrounded by an annular-shaped photon emitter; and in return the photon emitter is surrounded by a larger annular-shaped TPV array of photoelectric diode cells. The skilled person will be able to envision other geometric arrangements of the heat spreader, the photon emitter, and the photoelectric diode cells.

The hydrocarbon fuel fed to the reformer stage is selected from any gaseous or liquid hydrocarbon fuel that is capable of being converted into a syngas mixture comprising hydrogen and carbon monoxide. Suitable gaseous hydrocarbon fuels include, without limitation, methane, natural gas, ethane, ethylene, propane, propylene, butane, pentane, acetylene, fuel gas, bio fuel gas, and mixtures thereof; methane and natural gas being preferred. Suitable liquid hydrocarbon fuels include, without limitation, gasoline, kerosene, diesel, jet propulsion fuels, such as Jet A and Jet X, biomass fuels, and synthetic fuels obtained from Fisher-Tropsch processes.

The first supply of oxidant fed to the partial oxidation reactor comprises any chemical capable of partially oxidizing the hydrocarbon fuel selectively to a gaseous partial oxidation product comprising hydrogen and carbon monoxide (syngas). Suitable oxidants include, without limitation, essentially pure molecular oxygen, mixtures of oxygen and nitrogen, such as air, and mixtures of oxygen with one or more inert gases, such as helium and argon.

The hydrocarbon fuel and first supply of oxidant are provided to the partial oxidation reactor in a "fuel-rich" ratio such that there is insufficient amount of oxidant present to convert all of the fuel to complete oxidation products of carbon dioxide and water. The quantities employed of first supply of oxidant and hydrocarbon fuel are best described in terms of an O:C ratio, wherein "O" refers to atoms of oxygen in the first supply of oxidant and "C" refers to atoms of carbon in the hydrocarbon fuel, these being supplied to the partial oxidation reactor. Generally, the O:C ratio of first supply of oxidant to hydrocarbon fuel fed to the partial oxidation reactor is greater than about 0.5:1 and less than about 1.2:1.

The POX process desirably involves contacting the hydrocarbon fuel and the first supply of oxidant in the absence of co-fed external water, steam or mixture thereof. In this instance, the words "co-fed external water, steam or mixture thereof" refer to co-feeding, with the supplies of hydrocarbon fuel and first supply of oxidant, a supply of water, steam, or such mixture thereof as is imported from an external source, for example, an on-board water tank or steam generator or vaporizer. While this application broadly does not prohibit co-feeding water and/or steam to the reforming process, and while partial oxidation product yields are often enhanced by the addition of co-fed water and/or steam, in the present application co-feeding external water and/or steam might add an unnecessary burden.

The POX process operates at a temperature greater than about 700° C. and less than about 1,100° C. and a pressure ranging from sub-ambient to about 1 psig (6.9 kPa). A suitable gas hourly space velocity measured at 21° C. and 1 atm (101 kPa) ranges from about 10,000 liters of combined supply of hydrocarbon fuel and first supply of oxidant per liter of catalyst bed volume per hour (10,000 hr$^{-1}$) to about 750,000 hr$^{-1}$ which allows for high throughput. A POX efficiency of greater than about 75 percent and, preferably, greater than about 80 percent relative to equilibrium is achievable. The partial oxidation reactor is capable of operating for greater than about 1,000 hours without indications of coke production and catalyst deactivation.

The partial oxidation product exiting the partial oxidation reactor is passed into the premixer plenum where the product is supplemented with the second supply of oxidant fed through the second oxidant inlet. The second supply of oxidant supplied to the premixer plenum comprises any chemical capable of fully combusting the partial oxidation product to complete combustion products of carbon dioxide and water, such chemicals to include air and essentially pure oxygen. In one exemplary embodiment, the first and second supplies of oxidants are identical, and preferably, comprise air. If desired, however, the first supply of oxidant supplied to the partial oxidation reactor may be different from the second supply of oxidant supplied to the premixer plenum. The partial oxidation product and second supply of oxidant are provided in quantities sufficient to combust the partial oxidation product (hydrogen, carbon monoxide, and any unconverted hydrocarbon fuel) completely to carbon dioxide and water. Such quantities refer to a "fuel-lean" condition wherein the quantity of second supply of oxidant exceeds a stoichiometric ratio that balances the combustion reaction. Generally, the air-to-fuel mass ratio for this fuel-lean combustion ranges from about 10:1 to about 20:1, with combustion efficiencies increasing with increasing air-to-fuel ratios. Above about 20:1, blow-out may become a problem.

Temperatures of the gaseous combustion products exiting the deep oxidation reactor range from about 800° C. to about 1,200° C. In one embodiment, combustion gas exhaust is passed through a recuperator structure (FIG. 3) to further cool the combustion gases and heat the incoming second supply of oxidant. Combustion gases exiting into the environment via the recuperator ideally have at a temperature between about 120° C. and about 250° C. It should be appreciated that the partial oxidation reaction product comprises hydrogen, which facilitates a more uniformly distributed combustion across the heat spreader of the deep oxidation reactor.

EMBODIMENT

Example 1

A full scale two-stage combustor with associated photon emitter was designed and tested in accordance with this invention. The combustor was constructed as illustrated in FIGS. 1 and 2, including: a Stage 1 catalytic partial oxidation reactor 1 comprised of a fuel inlet 2 for inputting natural gas, an oxidant inlet 3 for inputting air, a catalytic partial oxidation reaction zone 11 comprising a MICROLITH brand ultra-short-channel-length metal substrate 12 having a rhodium catalyst 14 supported thereon (Precision Combustion, Inc., North Haven, Conn.), a glow plug 4 for initiating the partial oxidation process, and an outlet 5 for exhausting a partial oxidation reaction product comprising carbon monoxide and hydrogen. Disposed downstream thereof, a Stage 2 deep oxidation combustor comprised a premixer plenum 7 fluidly connected to the outlet 5 of the partial oxidation reactor 1, the premixer plenum 7 further having an inlet 6 for feeding a flow of a secondary oxidant. Downstream of the premixer plenum 7 was positioned an alumina ceramic foam matrix heat spreader 8 [Ask Chemicals Hi-Tech, L.L.C., Alfred Station, N.Y.; diameter, 3.93 inch (8.26 cm); thickness, 0.375 inch (9.53 mm); 45 pores per inch], wherein deep combustion occurred. A photon emitter 9 consisting of a circular quartz plate [McMaster Carr Supply Company, diameter, 4.00 inch (10.16 cm); thickness, 0.05 inch (1.25 mm)] was positioned 0.25 inch downstream of the ceramic foam matrix 8. Combustion gases exhausted to the environment from the gap 16 between the ceramic foam matrix 8 and the photon emitter 9.

The apparatus 100 was tested with up to 3.4 kWth natural gas input as fuel via fuel inlet 2 to the catalytic partial oxidation reactor 1. Air was employed to both the primary oxidant inlet 3 of the partial oxidation reactor 1 and the secondary oxidant inlet 6 to the premixer plenum 7. The catalytic partial oxidation reaction zone 11 was operated at a fuel-rich O:C ratio sufficient to maintain a temperature of 950° C. in the POX reactor to produce a product mixture of hydrogen ($H_2$) and carbon monoxide (CO). The deep combustion stage 8 was operated at a temperature of 1,100° C. under fuel-lean conditions, that is, with excess air so as to provide for complete conversion of the partial oxidation reaction products to carbon dioxide ($CO_2$) and water ($H_2O$). Combustion occurred within the ceramic foam matrix 8 under diffusion flame conditions. A thermocouple was placed at a center position on the upstream face of the quartz plate contacting the gaseous combustion product.

FIG. 5 depicts a graph of temperature versus time during operation of the two-stage combustor. The temperature at the center of the quartz plate was held at 1,100° C. during the test. The heat produced in the two-stage combustor was efficiently transferred to the quartz plate photon emitter, which appeared to have a uniform infrared glow. It is reliably expected that the emitted photons initiate a photoelectric reaction in an associated TPV diode cell for production of electricity.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A two-stage combustor comprising:
  (a) a partial oxidation reactor comprising:
    (i) a fuel inlet,
    (ii) a first oxidant inlet,
    (iii) a partial oxidation reaction zone comprising a mesh substrate having a partial oxidation catalyst supported thereon, the partial oxidation reaction zone disposed in fluid communication with the fuel inlet and the first oxidant inlet, and
    (iv) an outlet fluidly connected to the partial oxidation reaction zone;
  (b) a deep oxidation reactor:
    (i) the deep oxidation reactor including a premixer plenum having an upstream end and a downstream end; wherein at the upstream end the premixer plenum is fluidly connected to the outlet of the partial oxidation reactor; and further wherein the premixer plenum comprises a second oxidant inlet;
    (ii) the deep oxidation reactor including a heat spreader having an upstream end and a downstream end; wherein at the upstream end of the heat spreader the heat spreader is fluidly connected to the downstream end of the premixer plenum; and further wherein the heat spreader comprises a porous matrix capable of withstanding temperatures greater than 900° C.; and
    (iii) an outlet pathway fluidly connected to the downstream end of the heat spreader.

2. The two-stage combustor of claim 1 wherein the mesh substrate of the partial oxidation reactor comprises an ultra-short-channel-length ranging from 25 microns to 500 microns.

3. The two-stage combustor of claim 1 wherein the partial oxidation catalyst comprises at least one noble metal of Group VIII of the Periodic Table.

4. The two-stage combustor of claim 1 wherein the premixer plenum further comprises a flame arrestor.

5. The two-stage combustor of claim 1 wherein the premixer plenum is empty, excepting optionally that a flame arrestor is present.

6. The two-stage combustor of claim 1 wherein the heat spreader comprises a porous ceramic foam matrix selected from silica, alumina, aluminosilicates, zirconia, silicon carbide, and mullite.

7. The two-stage combustor of claim 1 wherein the heat spreader comprising the porous matrix has from 20 to 40 pores per inch.

8. The two-stage combustor of claim 1 wherein the heat spreader does not comprise a catalyst.

9. The two-stage combustor of claim 1 wherein the heat spreader comprises a catalyst.

10. The two-stage combustor of claim 1 wherein a recuperator is employed such that an outlet of the deep oxidation reactor and the second oxidant inlet share a common thermally conductive wall.

11. A two-stage combustor comprising:
  (a) a partial oxidation reactor comprising:
    (i) a fuel inlet,
    (ii) a first oxidant inlet,
    (iii) a partial oxidation reaction zone comprising a mesh substrate having a partial oxidation catalyst supported thereon, the partial oxidation reaction zone disposed in fluid communication with the fuel inlet and the first oxidant inlet, and
    (iv) an outlet fluidly connected to the partial oxidation reaction zone;
  (b) a deep oxidation reactor:
    (i) the deep oxidation reactor including a premixer plenum having an upstream end and a downstream end; wherein at the upstream end the premixer plenum is fluidly connected to the outlet of the partial oxidation reactor; and further wherein the premixer plenum comprises a second oxidant inlet;
    (ii) the deep oxidation reactor including a heat spreader having an upstream end and a downstream end; wherein at the upstream end of the heat spreader the heat spreader is fluidly connected to the downstream end of the premixer plenum; and further wherein the heat spreader comprises a porous matrix capable of withstanding temperatures greater than 900° C.; and
    (iii) an outlet pathway fluidly connected to the downstream end of the heat spreader; wherein a recuperator is employed such that an outlet of the deep oxidation reactor and the second oxidant inlet share a common thermally conductive wall.

* * * * *